United States Patent
Glass et al.

(10) Patent No.: US 12,282,461 B2
(45) Date of Patent: Apr. 22, 2025

(54) SYSTEM AND METHOD FOR SELECTIVE MIGRATION OF MAINFRAME RESOURCES TO A NON-MAINFRAME ENVIRONMENT

(71) Applicant: VirtualZ Computing Corporation, Minneapolis, MN (US)

(72) Inventors: Jeanne M. Glass, White Bear Lake, MN (US); Dustin W. Froyum, Golden Valley, MN (US); Vincent R. Re, Southport, NC (US); Marc S. Sokol, Palm Harbor, FL (US)

(73) Assignee: VIRTUALZ COMPUTING CORPORATION, Minneapolis, MN (US)

( * ) Notice: Subject to any disclaimer, the term of this patent is extended or adjusted under 35 U.S.C. 154(b) by 239 days.

(21) Appl. No.: 17/530,251

(22) Filed: Nov. 18, 2021

(65) Prior Publication Data
US 2023/0153279 A1    May 18, 2023

(51) Int. Cl.
*G06F 16/00*    (2019.01)
*G06F 16/21*    (2019.01)
(Continued)

(52) U.S. Cl.
CPC .......... *G06F 16/214* (2019.01); *G06F 16/258* (2019.01); *G06F 13/387* (2013.01); *H04L 67/12* (2013.01)

(58) Field of Classification Search
CPC .... G06F 16/214; G06F 16/258; G06F 16/387; H04L 67/12; H04L 67/565; H04L 69/08; H04L 69/18
See application file for complete search history.

(56) References Cited

U.S. PATENT DOCUMENTS 9,740,461 B2    8/2017 Peleg
10,033,797 B1 *  7/2018 Alger ..................... H04L 67/02
(Continued)

*Primary Examiner* — Diedra McQuitery
(74) *Attorney, Agent, or Firm* — Baker Botts L.L.P.

(57) ABSTRACT

A method includes receiving, from a client device, an input/output (I/O) request pursuant to a first protocol, the first protocol being a standards-based I/O protocol. The I/O request is communicated to a proxy communicatively coupled with a mainframe server, the mainframe server being configured to communicate using a second protocol, the second protocol being a proprietary, mainframe protocol that is inconsistent with the first protocol. The method further includes accessing a database having a mapping of a plurality of I/O requests of the first protocol to a plurality of corresponding capabilities of the second protocol, and converting the I/O request pursuant to the first protocol to a corresponding capability pursuant to the second protocol. Security and management policies associated with the mainframe server are enforced using the proxy and the I/O request is executed on the mainframe server, using the corresponding capability pursuant to the second protocol. Data is received from the mainframe server, in response to the I/O request and it is determined whether the data requires transformation in order to be consistent with the first protocol. In response to determining that the data requires transformation, the data received from the mainframe server is transformed into a data format consistent with the first protocol, and the transformed data is communicated to the client device in response to the I/O request.

17 Claims, 9 Drawing Sheets

(51) Int. Cl.
  *G06F 16/25* (2019.01)
  *G06F 13/38* (2006.01)
  *H04L 67/12* (2022.01)

(56) References Cited

U.S. PATENT DOCUMENTS

| | | | |
|---|---|---|---|
| 10,216,580 | B1 | 2/2019 | Peleg et al. |
| 10,228,879 | B1 | 3/2019 | Peleg et al. |
| 2003/0135482 | A1* | 7/2003 | Takahashi ............... G06Q 30/06 |
| 2003/0154401 | A1* | 8/2003 | Hartman ................. H04L 63/20 |
| | | | 726/30 |
| 2004/0073511 | A1* | 4/2004 | Beaumont ............ G06Q 20/108 |
| | | | 705/42 |
| 2005/0002354 | A1* | 1/2005 | Kelly .................... H04W 84/18 |
| | | | 370/329 |
| 2012/0144157 | A1* | 6/2012 | Crew .................... G06F 9/5066 |
| | | | 712/30 |
| 2016/0021064 | A1* | 1/2016 | Lock .................. H04L 63/0428 |
| | | | 726/26 |
| 2017/0237645 | A1* | 8/2017 | Shanbhag ............... H04L 45/02 |
| | | | 370/250 |
| 2017/0277416 | A1* | 9/2017 | Bohling, III ........ G06F 3/04847 |
| 2022/0164351 | A1* | 5/2022 | Chen ................. G06F 16/24542 |

* cited by examiner

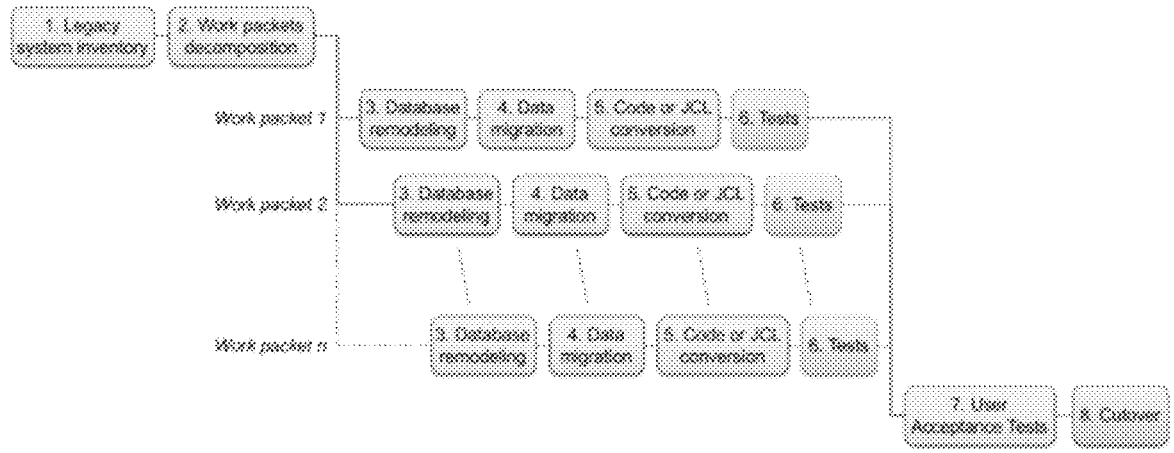

Figure 1 – Automated Refactoring steps.

- Step 1 performs an automated inventory of the mainframe and populates a repository of components to be migrated.
- Step 2 consists of a detailed analysis of the applications, data model, architecture preferences, coding styles, database connections, error handling, and refactoring options. All of this leads to the definition of how to piecemeal the code transformation with work packets and the overall test strategy.
- In Step 3, for each work packet, the data model is defined and created in the target database.
- Step 4 automatically generates programs and processes for unloading, transforming, validating, and loading of data from the source data store to the target database.
- In Step 5, Modern Systems' CTU is used to reverse-engineer the COBOL code into an intermediate language, and then to forward-engineer the target Java code.
- Step 6 performs regression tests for each work packet, making sure there is functional equivalence between the source mainframe programs and the new Java code.
- Step 7 is the user acceptance test execution process.
- In Step 8, once these tests are successful, the cutover to production takes place.

FIG. 6

SYSTEM AND METHOD FOR SELECTIVE MIGRATION OF MAINFRAME RESOURCES TO A NON-MAINFRAME ENVIRONMENT

BACKGROUND

The disclosure relates generally to mainframe operations, and more specifically to a system and method for data sharing between mainframe and non-mainframe resources.

BRIEF SUMMARY

According to one aspect of the present disclosure, a method includes receiving, from a client device, an input/output (I/O) request pursuant to a first protocol, the first protocol being a standards-based I/O protocol. The I/O request is communicated to a proxy communicatively coupled with a mainframe server, the mainframe server being configured to communicate using a second protocol, the second protocol being a proprietary, mainframe protocol that is inconsistent with the first protocol. The method further includes accessing a database having a mapping of a plurality of I/O requests of the first protocol to a plurality of corresponding capabilities of the second protocol, and converting the I/O request pursuant to the first protocol to a corresponding capability pursuant to the second protocol. Security and management policies associated with the mainframe server are enforced using the proxy and the I/O request is executed on the mainframe server, using the corresponding capability pursuant to the second protocol. Data is received from the mainframe server, in response to the I/O request and it is determined whether the data requires transformation in order to be consistent with the first protocol. In response to determining that the data requires transformation, the data received from the mainframe server is transformed into a data format consistent with the first protocol, and the transformed data is communicated to the client device in response to the I/O request.

In accordance with another embodiment, it is determined whether the data received from the mainframe server requires filtering in order to be consistent with the I/O request and the first protocol. In response to determining that the data received from the mainframe server requires filtering in order to be consistent with the I/O request and the first protocol, the data received from the mainframe server is filtered. The transformed and filtered data may be communicated to the client device in response to the I/O request.

In accordance with yet another embodiment, a plurality of additional I/O requests pursuant to the first protocol, are received from the client device. For each of the additional I/O requests received pursuant to the first protocol: the additional I/O request is communicated to a proxy communicatively coupled with the mainframe server; the database having a mapping of a plurality of I/O requests of the first protocol to a plurality of corresponding capabilities of the second protocol is accessed; the additional I/O request pursuant to the first protocol is converted to an additional corresponding capability pursuant to the second protocol; the additional I/O request is executed on the mainframe server, using the corresponding additional capability pursuant to the second protocol; additional data is received from the mainframe server, in response to the additional I/O request; it is determined whether the additional data requires transformation in order to be consistent with the first protocol; in response to determining that the additional data requires transformation, the additional data received from the mainframe server is transformed into the data format consistent with the first protocol; and the transformed additional data is communicated to the client device in response to the additional I/O request.

In accordance with yet another embodiment, the security and management policies governing the operation of the mainframe server include backup policies, file size policies and encryption policies associated with the mainframe server, that may be determined.

In accordance with still another embodiment, the client device may include a Microsoft SQL server, and the database may include a mapping of a plurality of I/O requests associated with Microsoft SQL with a plurality of corresponding capabilities associated with VSAM.

BRIEF DESCRIPTION OF THE DRAWINGS

Aspects of the present disclosure are illustrated by way of example and are not limited by the accompanying figures with like references indicating like elements.

FIG. 6 illustrates an example mainframe to AWS cloud migration.

DETAILED DESCRIPTION

Figure 1A:
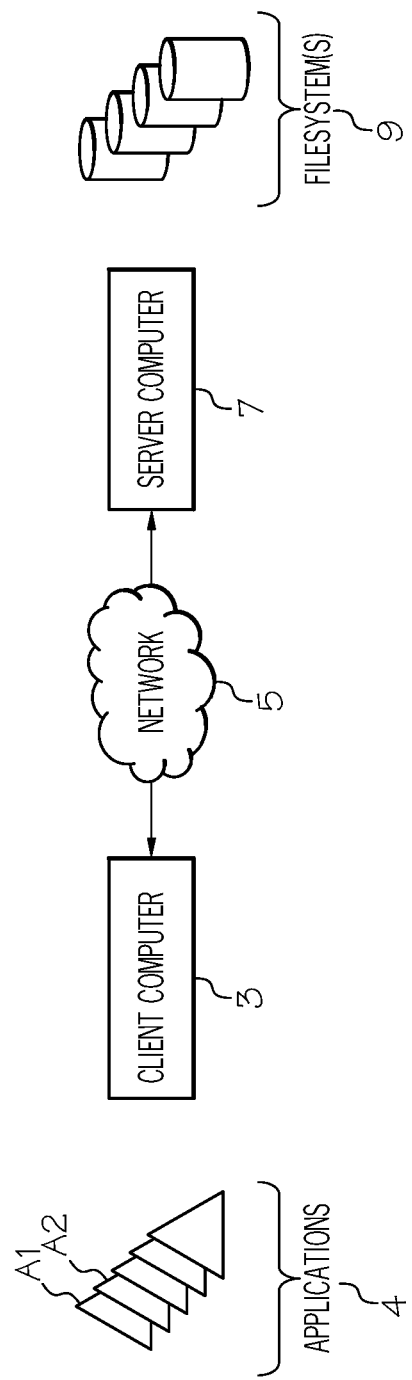
FIG. 1A illustrates a block diagram of a system for data sharing between mainframe and non-mainframe environments, in accordance with a particular non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Moreover, any functionality described herein may be accomplished using hardware only, software only, or a combination of hardware and software in any module, component or system described herein. Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including a symbolic programming language such as Assembler, an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a cellular network, or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The teachings of the present disclosure relate to the selective interaction of resources from a mainframe environment to a non-mainframe environment. A non-mainframe environment refers to any computing resource(s) (hardware and/or software) that operate using an operating system that is not a mainframe operating system, for example, Windows, Linux and Unix. In general, any mainframe environment employs a "proprietary" input/output (I/O) system, meaning that non-mainframe resources cannot gain access to or interact with mainframe resources since the I/O structure is not published or available to other computer resource providers. Non-mainframe resources, on the other hand, typically employ "open" and standards based-based client applications that allow non-mainframe resources to easily interact with each other. Thus, in accordance with a particular aspect of the present disclosure, a data sharing model is provided that allows proprietary I/O systems (e.g., mainframe resources) to be accessed by open and standards-based client applications (e.g., non-mainframe resources).

Many non-mainframe resources are utilized to build and operate public, private or hybrid cloud environments that leverage non-mainframe resources. For purposes of illustration throughout this description, reference is made to a "cloud environment." Such reference is intended to mean non-mainframe resources that operate as a public, private or hybrid cloud using non-mainframe resources. It should be recognized by those of ordinary skill in the art, that any non-mainframe computing resource(s) could be used in lieu of or in addition to the cloud environment discussed herein. The use of cloud environment is provided as one example, but it not intending to be limited to a "cloud" but instead could be replaced by or include any non-mainframe resources.

In accordance with another aspect of the present disclosure, a method is provided that allows for transactions executing on one platform to be transparently routed to another computer for execution, even where the "target" computer (computer that the transaction is being routed to) is of a different architecture or operating system. For example, a transaction executing on a mainframe platform transparently routed to a non-mainframe computer for execution, or vice-versa.

Mainframes are powerful, multi-processor computers used primarily by large organizations for critical applications and bulk data processing, such as census, industry, consumer statistics, enterprise resource planning, and transaction processing. A mainframe computer is large but not as large as supercomputer and has more processing power than some other classes of computers, such as mini-computers, servers, workstations, and personal computers. Mainframe computers are often used as servers within an enterprise. The term mainframe is typically used to distinguish high-end commercial computers (i.e., mainframes) from less powerful machines.

Modern mainframe design is characterized less by raw computational speed and more by design that allows, inter alia: (i) redundant internal engineering resulting in high reliability and security; (ii) extensive input-output ("I/O") facilities with the ability to offload to separate engines; (iii) strict backward compatibility with older software; (iv) high hardware and computational utilization rates through virtualization to support workload isolation and massive throughput; and (v) the ability to dynamically and non-disruptively increase or decrease capacity (e.g., processors and memory) as needs change.

Processing capacity of the mainframe computers is often measured in terms of millions of service units (MSUs) per hour that are used to execute tasks. Mainframe customers are often charged for their software application that runs on mainframe based on peak MSU consumption (i.e., the highest amount over a certain period of time, or a predetermined period of time (certain time of day(s), certain days, certain week(s), certain month(s), etc.)).

The high stability and reliability of a mainframe enables these machines to run uninterrupted for very long periods of time, with mean time between failures (MTBF) often measured in decades. Mainframes have high availability, one of the primary reasons for their longevity, since they are often used in applications where downtime would be costly or catastrophic. The term reliability, availability, and serviceability (RAS) is a defining characteristic of mainframe computers. In addition, mainframes are typically more secure than other computer types. For example, the National Institute of Standards and Technology vulnerabilities database rates traditional mainframes such as IBM Z (previously called z Systems, System z and zSeries), as among the most secure with vulnerabilities in the low single digits as compared with thousands for Windows, UNIX, and Linux.

In general, mainframes are designed to handle very high volume input and output (I/O) and emphasize throughput computing. It is common in mainframes to deal with massive databases and files. Terabyte to Petabyte-size record files are not unusual in the mainframe environment. Compared to a typical PC, mainframes commonly have hundreds to thousands of times as much computer storage online, and can access it reasonably quickly.

Due to the complex and sophisticated nature of mainframes, they often require corresponding complex and sophisticated software in order to run properly and efficiently. Due to these complexities, mainframes are very expensive to purchase and maintain. Moreover, continued use of the software typically requires the payment of substantial fees either annually or on a per "use" basis. The per "use" basis may measure the number of transactions, the amount of resources used over a period of time and may also take into account the number of mainframes having a particular application installed thereon, or the number of applications on a particular mainframe.

Many enterprises rely upon mainframes for their ability to handle large datasets, and enterprise-critical applications that require the sheer power and reliability of the mainframe. An enterprise that relies upon mainframe computing typically employs one or more mainframe environments that each employ multiple applications running simultaneously, many or all of which rely upon at least one common dataset within the mainframe environment. Moreover, The idea of concurrency or sharing with integrity is important too . . . if multiple applications share a dataset, it's important that updates be handled in a consistent way so that the applications don't inadvertently "interfere" with one another—this is something unique to mainframes, and it's something that should be part of our story . . . we provide access to this same information from potentially many places, with no loss of integrity.

Over time, the cost of computing resources outside of a mainframe environment has dropped dramatically to a point of widespread affordability, while the cost of computing resources inside the mainframe environment has decreased, but remains relatively expensive since its initial costs were astronomically high. In some cases, costs associate with running a mainframe have risen. Thus, there is a desire among many enterprises to reduce their reliance on mainframe resources, and leverage non-mainframe resources instead. Non-mainframe resources include computer resources and software that operate in an operating system that is not a mainframe operating system, for example, Windows, Linux and Unix.

The widespread availability of alternative computing platforms and cloud computing resources provides attractive alternatives to solely relying on resources in a mainframe environment. In general, certain applications are best suited to the mainframe; others are best suited to other computing platforms (e.g., the cloud). Typically, customers have to pick one or the other for each application, and mainframe applications and cloud applications cannot talk to each other today. The teachings of the present disclosure allow a customer to put the application where it is best suited, because they can share data back and forth across applications and across platforms (e.g., mainframe vs. non-mainframe). This allows for a hybrid approach as opposed to one or the other alternatives. Enterprises are therefore motivated to move all but their most enterprise-critical applications and computing resources off of the mainframe, to less expensive computing resources. Transitioning from mainframe to cloud services, for example, allows enterprises to "modernize" their businesses, reduce costs and increase agility.

Applications running on the mainframe typically share access to data stored within the mainframe. For example, multiple applications running in an z/OS environment employing virtual storage access method (VSAM) can share datasets within the mainframe environment among multiple applications. Those sharing applications can all be updating that same shared VSAM file, and the system coordinates these updates such that the applications don't interfere with each other or corrupt data. However, data in this environment lacks the structure of, for example, a typical database. Thus, it becomes difficult for an application running outside of the mainframe environment to "interact" with the mainframe environment by leveraging any applications within the mainframe environment or relying upon any datasets within the mainframe environment. It also becomes difficult to remove an application(s) from the mainframe environment and relocate the application to another environment (e.g., cloud environments, Windows operating system) without relocating the entire environment with all of its data, to the new environment. Another challenge is that the IO semantics of VSAM are very different from other environments. VSAM has primitives to search files by key, rewrite records in place, read files forward and backward and so on; these capabilities don't typically exist in non-mainframe environments.

FIG. 1A illustrates a client computer 3 communicatively coupled with a server computer 7, using a network 5. Server computer 7 is a computer with some type of essential data stored on it. In the illustrated embodiment, the server is running the z/OS operating system, but in alternative embodiments, server computer 7 may be running other operating systems in addition to or in lieu of z/OS.

Filesystems 9 comprise one or more files organized according to the conventions of the server computer 7, which often include proprietary formats. In the illustrated embodiment, z/OS files stored on mainframe storage devices are being accessed with VSAM and SAM (BSAM/QSAM/BPAM) access methods, although other methods are available. For example, the teachings of the present disclosure envision other operating systems, file storage media and access protocols as well, including SQL and non-SQL databases, hierarchical or network databases, and any other proprietary format.

Network 5 may be any combination of hardware and software that can be used to connect the client and server computer. In the illustrated embodiment, the TCP/IP network protocol is envisioned. Typically, the network layer includes a networkable file access protocol, such as some variant of NFS, SMB, or other common network file sharing protocols. Other protocols and devices can be used as well, such as SNA or NetBIOS networks, or hardware communications devices that provide a channel between client and server (such as two mainframes connected by channel-to-channel adapters, or two UNIX computers connected by a serial port).

Client computer 3 may comprise any type of computer and operating system that can be connected to the server over the designated network. In the illustrated embodiment, client computer(s) 3 are computers based on Intel hardware platforms running Windows or Linux operating systems, both as stand-alone computers and as entities running in popular cloud environments. Any client computer capable of connecting to the server computer can be used, including mobile devices, IoT devices, smartphones, tablets, various architectures of servers, etc.

Applications 4 comprise applications that are software that may be written in any programming language that accesses data using standards-based I/O protocols. In the illustrated embodiment, client applications 4 may be developed using one or more programming languages including C/C++, Java and COBOL programming languages, and they access data using POSIX-defined file I/O APIs. The present disclosure also envisions other data access protocols and APIs, including common database products (such as JDBC/ODBC), so-called No-SQL protocols (as found in Hadoop, Cassandra, MongoDB and others), web service data APIs such as ODATA, and common proprietary APIs such as the BerkeleyDB indexed file API.

The teachings of the present disclosure provide systems and methods that enable client applications 4 to access data from the server computer 7, even though the data on the server may be stored in incompatible and proprietary ways. An example from the illustrated embodiment include a Java application written using standard POSIX I/O functions ("open", "close", "read" "write") that can process data stored in the proprietary VSAM file format. This capability provides sufficient semantic mapping from the file access protocol employed by the application to the low-level primitive I/O capabilities exposed by the server, without changing the application to be aware of these capabilities.

Such capability is provided even though there may be differences in data formats that impact the way data is stored and processed across client computer 3 and server computer 7. An example may include a z/OS VSAM file, commonly encoded in an EBCDIC codepage, versus a Windows or Linux application coded so as to expect data in an ASCII or UNICODE code page. Using metadata describing the server's data layouts, the teachings of the present disclosure allow the system to automatically and in real-time transform between the native data structures found on the physical storage medium, to the formats expected by the client application. The transformation occurs at a field-by-field level and anticipates different character formats, number representation formats (ie, "big-endian" versus "little endian"), structure alignments and other complex transformations. Multiple different transformations can be in place concurrently if multiple applications access data from client computers having different data structure expectations.

Moreover, the teachings of the present disclosure enable concurrency such that multiple applications, whether running on one or many client computers 3, can access the same server data on server(s) 7 with complete isolation and integrity. If Application "A1" and "A2" each update the same files, the teachings herein ensure that these updates are done with full integrity such that "A1" and "A2" can operate in parallel with no special coordination between the applications.

The teachings disclosed herein also provide an additional layer of security and management that occurs on the server computer 7, enabling administrators of the server computer(s) 7 to have control over the applications (e.g., A1 and A2) that may access the system, the entitlements they may have, and whether their activity is audited.

Figure 1B:
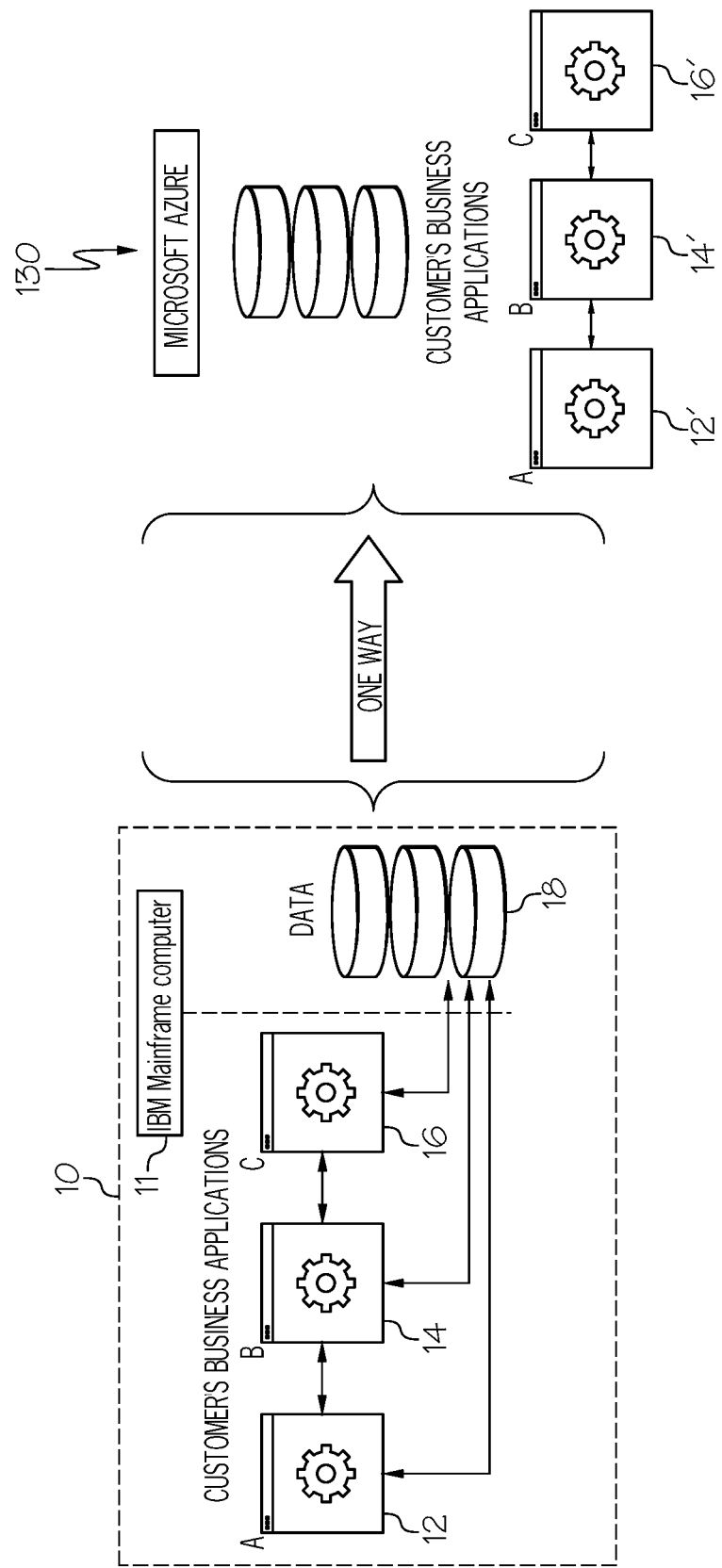
FIG. 1B illustrates block diagram of hardware and software configurations for the system of FIG. 1, in accordance with a particular non-limiting embodiment.

FIG. 1B illustrates a mainframe environment 10 of a particular enterprise, in accordance with another embodiment of the present disclosure. In the embodiment illustrated in FIG. 1B, mainframe environment 10 comprises an IBM mainframe computer 11. However, in particular embodiments, mainframe environment 10 may comprise multiple mainframe computers. Mainframe 11 may be an IBM zSeries mainframe such as IBM z14, IBM z13, or IBM z13s or another mainframe device, and may include an operating system. In alternative embodiments, it may include another type(s) of mainframe computer(s) The operating system may be an IBM z/OS operating system or some other mainframe operating system. In a particular embodiment of the present disclosure, the mainframe computer may comprise a z/OS 2.4 on an IBM zPDT, operating at approximately 7-9 MSU running one or more general-purpose CPUs and at least one ZiiP processor (z Integrated Information Processor).

Mainframe 11 may contain applications such as SAS 9.4m5, SAS IT Resources Management, Enterprise Cobol for z/OS, Cobol V4, z/OS XL C/C++, Enterprise PL/I for z/OS, CA Cleanup, CA Easytrieve Report Generator, CA Endevor Software Change Manager, CA Librarian, CA MICS Resource Management, CA Optimizer, CA Optimizer/II, CA Panvalet, IBM Compiler and Library for REXX and Developer for z Systems, or any other applications suitable to execute a task.

The primary distinguishing characteristic of a mainframe is the operating system that runs the environment. Some of the more popular mainframe operating systems include z/OS, z/VM, z/VSE, z/Transaction Processing Facility and Linux. These mainframe operating systems are distinguished from the most popular non-mainframe operating systems such as Windows, OS X, iOS, Android, Linux, Unix. Other distinguishing characteristics of a mainframe environment include the file structure of the datasets and scalability (e.g., the ability to expand a single computer across a capacity range of over 1000:1 and to have tens of thousands of connected peripherals).

A mainframe environment is typically defined by a number of applications running on a mainframe operating system, with at least some and in some cases all of the applications sharing a particular dataset. In order to access the datasets, these applications rely upon at least one common file system and access method (VSAM, QSAM, BSAM, etc.) The mainframe environment of a particular enterprise typically refers to one or more mainframes, applications, shared storage, datasets and resources that comprise the environment leveraged by the enterprise. A particular mainframe environment may be defined by the mainframe resources behind a particular firewall set up by the enterprise. A mainframe environment may also be defined by a single, physical mainframe computer structure or the environment may include the resources within the organization (e.g., controlled by the organization, or behind the firewall of the organization).

The mainframe environment 10 of the present disclosure includes applications 12, 14, and 16 being run by the enterprise. In a typical mainframe environment, many applications will run simultaneously. However, three applications (12, 14 and 16) are provided in FIG. 1B for illustrative purposes.

Applications 12, 14 and 16 rely upon dataset(s) 18 stored within the mainframe environment. The dataset(s) 18 may be arranged according to one or more of various data sets, including but not limited to a partitioned dataset (PDS), a portioned dataset extender (PDSE), VSAM key Sequenced Data Set (VSAM KSDS), VSAM Relative Record Data Set (VSAM RRDS), VSAM Entry-sequenced data set (VSAM ESDS), QSAM (Queued Sequential Access Method (QSAM), and/or UNIX Services Filesystems.

Multiple applications of applications 12, 14 and 16 typically share particular data of dataset(s) 18 stored within the mainframe environment. Thus, applications within the mainframe environment become reliant upon dataset(s) 18, and cannot easily be removed from the mainframe environment and/or moved to another mainframe environment without dataset(s) 18.

In certain embodiments, mainframe environment 10 may represent one or more SYSPLEXes. A SYSPLEX is a group of distinct instances (images) of the mainframe operating system (i.e., z/OS). The mainframe operating system images could be running in separate physical computers, or they may be running in separate LPARs within a single computer, or they could be a combination of both. The z/OS instances participating within a SYSPLEX communicate using variety of different specialized communication components and hardware (e.g., XCF).

FIG. 1B also illustrates a non-mainframe environment. A non-mainframe environment may include any number of environments running various operating systems, for example Microsoft Windows, Linux, VMware Unix. For purposes of illustration, Microsoft Azure cloud environment 30 is illustrated in FIG. 1B. In alternative embodiments, cloud environment 30 may comprise an Amazon Web Services, and/or Google Cloud environment. Cloud environment 30 includes enterprise business applications 12', 14' and 16'. In a typical cloud environment, many applications will run simultaneously. However, three applications (12', 14' and 16') are illustrated in FIG. 1B for illustrative purposes.

The teachings of the present disclosure are intended to accommodate data sharing among the illustrated mainframe and cloud environments, even though the mainframe environment employs proprietary I/O systems. This allows for the proprietary I/O systems to be accessed by the open and standards-based applications of the cloud environment.

The teachings herein also accommodate mainframe to cloud migration, "re-platforming", or "re-hosting." In particular embodiments, this may be accomplished by selectively migrating certain applications, dataset(s) or workloads from the mainframe environment to the cloud environment. Accordingly, applications 12', 14' and 16' are intended to be analogs of applications 12, 14 and 16. In other words, application 12' is intended to be the "same" application as application 12, but configured for a different environment. For example, source code of application 12 may be written in Cobol, but may be compiled to run in a cloud environment in order to arrive at application 12'. In an alternative embodiment, application 12' may be a different application (either commercial-off-the-shelf, specialized and/or proprietary) that accomplishes the same function as 12 using the same data that is available to application 12.

Multiple applications of applications 12', 14' and 16' rely upon data 18' in operation. However, given that cloud environment 30 is a "cloud" environment, all of the resources of cloud environment 30, including applications 12', 14' and 16', and data 18' may be distributed throughout the world in order to leverage the most cost effective, efficient and/or secure resources for accomplishing any given job, task, operation, workflow or transaction. A job is a separately executable unit of work and runs on the mainframe. This representation of a unit of work may consist of one task or multiple tasks. Each task may further consist of one step or multiple steps (transactions), where the execution of the step(s) may be required to complete a particular task of the multiple tasks.

In general, by "cloud" environment, it is meant to refer to the practice of using a network of remote servers (e.g., in some cases hosted on the internet) to store, manage, and process data, rather than a local server or a personal computer. In this manner, distributed resources around the globe (e.g., located outside of the firewall of the particular enterprise referred to above, may be leveraged to accomplish transactions previously intended for the mainframe environment.

Figure 1C:
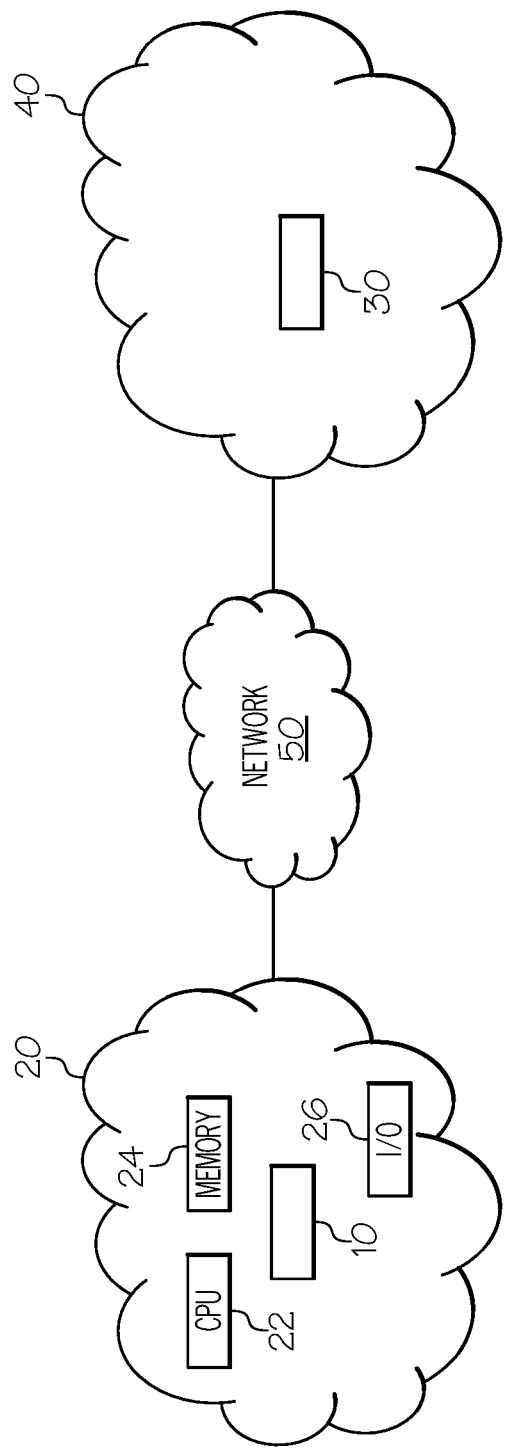
FIG. 1C illustrates a block diagram of a system for data sharing between mainframe and cloud, in accordance with another particular non-limiting embodiment of the present disclosure.

As illustrated in FIG. 1C, mainframe environment 10 may exist within network 20, which may include one or more processors (CPUs) 22 capable of executing one or more executable instructions. Network 20 may also include one or more computer readable storage devices (e.g., memory) that may be volatile memory, non-volatile memory, or a combination of the two. Network 20 may also include one or more input/output devices 26 to allow network 20 to communicate with other networks, such as network 40 (which comprises some or all resources of the cloud environment) and network 50. Network 50 may be a Local Area Network (LAN), Wireless Local Area Network (WLAN), or a Wide Area Network (WAN). Mainframe environment 10 may communicate with cloud environment 40 over network 110 using appropriate communication protocol (e.g., TCP/IP).

Most enterprises today (including approximately 8,000 mainframe customers) are looking to move their IT operations to the cloud for cost savings and to enable the modernization of their IT infrastructure, and to allow for growth. However, given most technology available today, converting from mainframe environment 10 to cloud environment 30 for even a moderately sized enterprise is a high-risk, high-dollar endeavor that may take large teams of people multiple years to accomplish. When a network of inter-connected applications and data can be spun-off and moved to the cloud one at a time, tracking their dependencies can be daunting, and it may turn out to be too entangled to proceed with a safe migration. The risk involved is loss of data, loss of functionality of the cloud environment or services it provides, crashing of applications, inoperability of applications within the environment or corruption of data. Since enterprises that have access to mainframe environments typically put the most critical functions in the mainframe environment, the culmination of any such risks can be devastating to the enterprise.

As an example of the time, cost and complexity of such an effort, Amazon Web Services published an example of the manner in which the New York Times accomplished mainframe to AWS cloud migration, in a blog in May 2019 (see, ttps://aws.amazon.com/blogs/apn/automated-refactoring-of-a-new-york-times-mainframe-to-aws-with-modern-systems). The process involved an eight step process that occurred over a period of five years, in order to transform a single legacy COBOL-based application into a modern Java-based application. See FIG. 6.

Figure 1D:
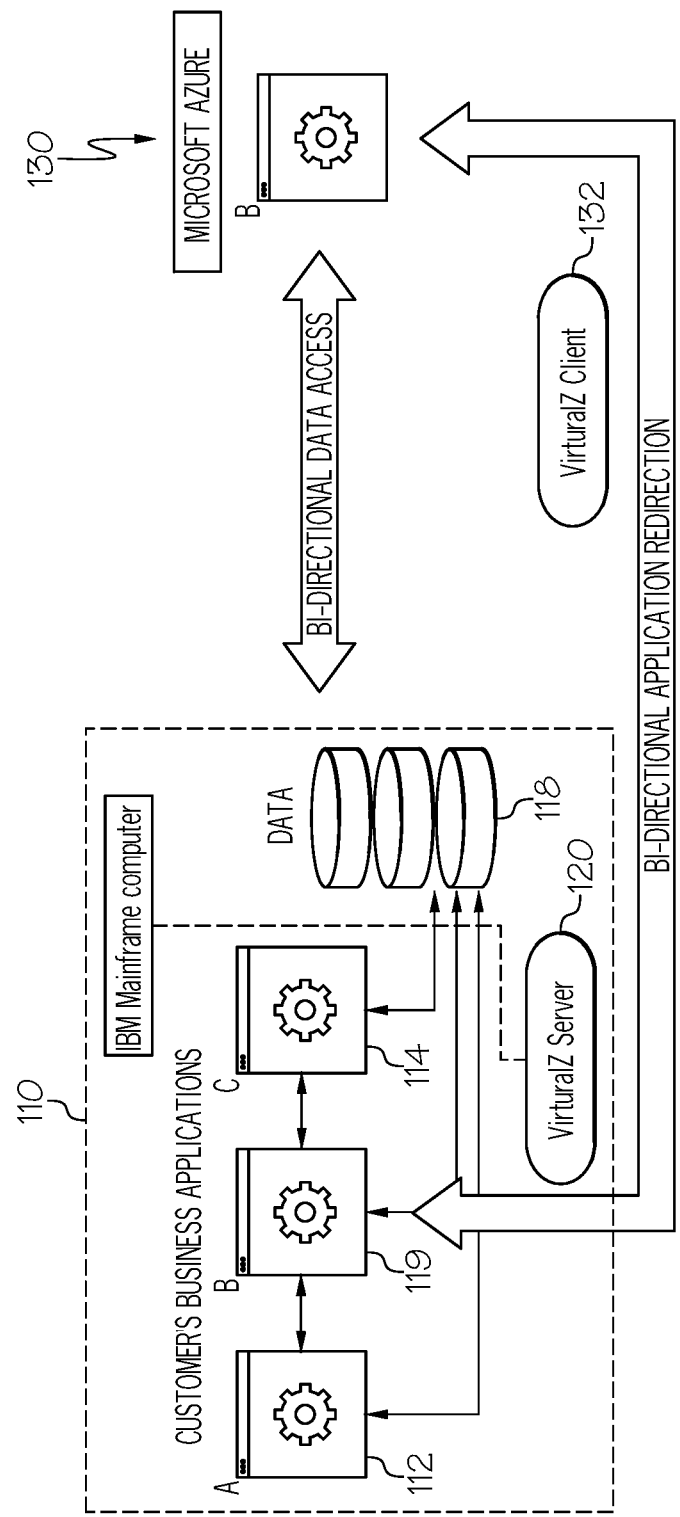
FIG. 1D illustrates a block diagram of a system for data sharing between mainframe and cloud, in accordance with another particular non-limiting embodiment of the present disclosure.

FIG. 1D illustrates an alternative solution for at least partially migrating, or converting a mainframe environment to a cloud environment. In accordance with the teachings of the present disclosure, a partial conversion may include "moving" one or more (but fewer than all) applications from the mainframe environment to a cloud based environment while continuing to operate the mainframe environment and relying upon data within the cloud environment. It may also include operating one or more applications outside of the cloud environment but using data stored within the cloud environment (e.g., dataset(s) 18). It may also include updating the data of the cloud environment with data generating by the applications running outside of the cloud environment.

Whether the goal of an organization is to convert entirely from the mainframe environment to the cloud environment, or only convert certain applications, features, functions, workloads, etc. to the cloud based environment, the teachings of the present disclosure allow this to be accomplished in a way that avoids the time, expense and risk of an all or nothing approach. Such teachings also allow for the migration of one or more applications (typically, but not exclusively, fewer than all) in much less time, and with much less risk, by allowing the mainframe environment and the cloud environment to run simultaneously, relying upon and continuously updating a common data among the mainframe environment and the cloud environment.

The approach set forth in FIG. 1D is a mainframe to cloud "bi-directional" redirection. It comprises an incremental approach to enabling granular migration of individual applications, or applications independent of the applications' data, that achieve faster time-to-value with lessened perceived risk. Thus, the teachings of the present disclosure allow enterprises running mainframes to safely migrate one application at a time, in a bi-directional fashion. This limits the need to unravel existing application and data inter-dependencies, which results in faster time to cost savings for the enterprise, with far less risk.

For example, any particular large airline may never want to move its ticketing system to the cloud, since ticketing systems of large airlines may always require the power of a mainframe. So given today's technology, such an airline would not be candidate for mainframe to cloud migration for any of its computing resources. However, given the teachings of the present disclosure, such an airline could leave its ticketing system on the mainframe, but migrate other applications that are interconnected with the ticketing system to a cloud environment in order to see significant cost savings.

FIG. 1D illustrates a mainframe environment 110 that includes a plurality of applications 112, and 114 being run by the enterprise. The mainframe environment also includes dataset(s) 118 that includes one or more datasets accessible by applications 112 and 114. In accordance with the teachings of the present disclosure, mainframe environment 110 also includes a proxy 119 to allow for redirection of features and functions, away from the mainframe environment. Proxy 119 comprises software that allows for communication between the mainframe environment and the cloud environment. Thus, proxy 119 comprises specialized software.

In the illustrated embodiment, proxy 119 is z/OS (server-side) software that may be structured so as to be eligible for execution on one or more zIIP special processors, thus helping the enterprise to lower z/OS general processing license fees. Even though proxy 119 will consume MIPS (and bandwidth) of the mainframe environment, executing on a zIIP processor leverages the available lower software license fees and hardware costs while limiting the higher cost z/OS general processing MIPS consumption.

Enterprise environment 110 also includes a server 120 that can help to manage communications and distribution of jobs or transactions among mainframe environment 110 and provide real-time mainframe data access and updating to cloud environment 130. Cloud environment 130 can include any or all of the same resources available to cloud environment 30.

Server 120 may monitor any jobs or transactions being executed within mainframe environment 110. A job is a separately executable unit of work defined by a user and runs on the mainframe. This representation of a unit of work may consist of one task or multiple tasks. Each task may further consist of one step or multiple steps (transactions), where the execution of the step(s) may be required to complete a particular task of the multiple tasks. Server 120 may monitor a particular task being executed within mainframe environment 110. Server 120 may determine that a particular task requires a particular application(s) to execute. In response to determining that a particular task requires an application, server 120 may determine that cloud environment 130 has the necessary application and/or any other necessary resources to accommodate the job or associated transactions.

Each of server 120 and client 132 may include one or more processors (CPUs) capable of executing one or more executable instructions, as well as one or more computer readable storage devices (e.g., memory) that may be volatile memory, non-volatile memory, or a combination of the two. Each of server 120 and client 132 may also include one or more input/output devices.

Proxy 119 may be a part of or separate from server 120. Proxy 119 may also operate independent of server 120 and may accomplish some or all of the functionality described below with respect to server 120. Server 120 also communicates with client 132. Together, server 120 and client 132 collectively manage communications between enterprise environment 110 and cloud environment 130. Accordingly, server 120 and client 132 may include any specialized hardware and/or software necessary to accommodate communication among environments 110 and 130.

In accordance with particular embodiments, any access to the mainframe may be done in a secure manner. For example, it may be possible to specify a security identity when attaching a mainframe file share to a remote system, and then all z/OS file access for that share will reference that particular user. Thus, security checking will leverage the customer's security product (e.g., CA ACF2, CA Top Secret, or IBM RACF) and any other mainframe security policies that the enterprise defines.

In alternative embodiments, remote access may trigger "normal" mainframe management instrumentation, meaning that files can be automatically archived/recalled, audited, monitored for performance, etc.

In accordance with particular embodiments, network flows may follow industry-standard network file sharing protocols (e.g., NFS V4), with the benefit that little to no data-sharing software will be required on the "client" side (i.e., the cloud environment) when accessing basic mainframe data. Basic access to mainframe data may be configured to work from any system having an appropriate NFS client, including Windows, Linux and other platforms.

Thus, the teachings of the present disclosure can be used to make a broad collection of datasets of the mainframe environment accessible from applications running in a cloud environment, including sequential (QSAM/BSAM), partitioned (PDS/PDSE) and VSAM datasets, including those discussed above. Moreover, the teachings of the present disclosure include the ability to randomly process records within a VSAM dataset (e.g., search a VSAM file for a record matching a particular key or relative record number, and then read just that single record). The teachings will also include the ability to access those records sequentially (for example, if a keyed VSAM KSDS is accessed, read the dataset in sequential order—i.e., order of ascending keys since the file is a VSAM KSDS).

Moreover, the teachings of the present disclosure provide complete read, write, and update functionality from the mainframe environment. In other words, the migrated application(s) running in the cloud environment will have the ability to read from the mainframe environment, write to the mainframe environment, and/or update a dataset within the mainframe environment. This can be accomplished in a way that is essentially transparent to the mainframe environment. This also allows for a transaction that was initially intended for the mainframe environment to be easily replicated in other environments, without impacting the integrity of data as observed from independent applications.

Figure 2:
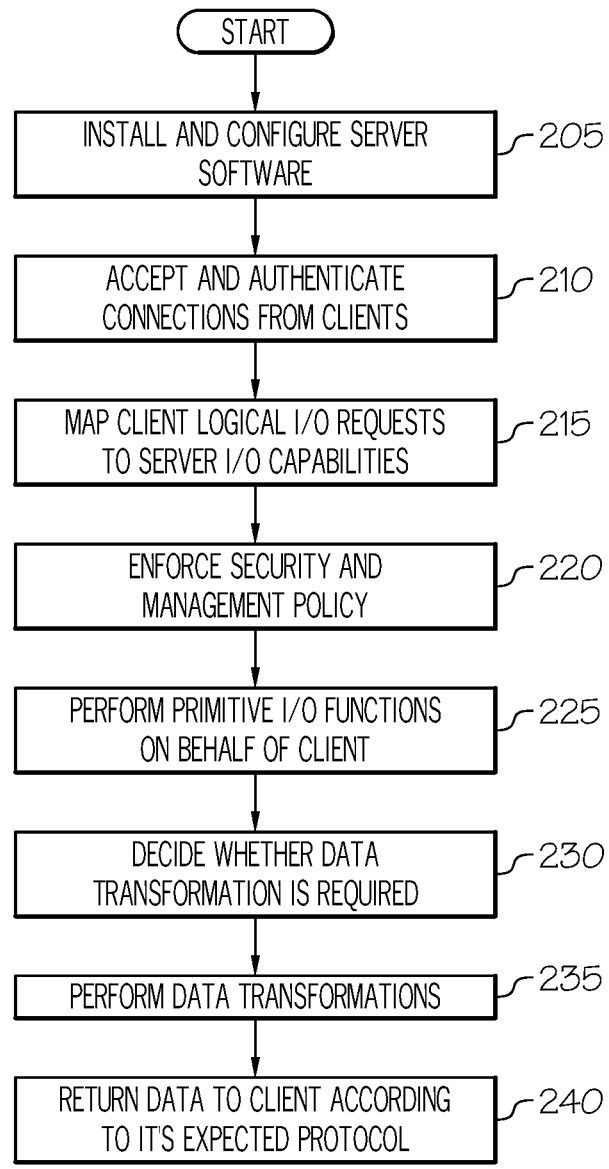
FIG. 2 illustrates a flowchart of a method for data sharing between mainframe and cloud, in accordance with a particular non-limiting embodiment of the present disclosure.

FIG. 2 illustrates a method for data sharing between a mainframe resource and a non-mainframe resource, in accordance with a particular embodiment of the present disclosure. The method begins at step 205 where the installation and configuration of server software. The server software may comprise any of the software described within this specification and/or a variety of others. At step 210, the connections from the client to the server are accepted and/or authenticated to allow communication between the server (e.g., mainframe) and client (non-mainframe). At step 215, client logical I/O requests are mapped to server I/O capabilities.

Security and management policies are enforced at step 220, and primitive I/O functions are performed by the server on behalf of the client at step 225. Next, at step 230, a decision is made as to whether data transformation is required. If no data transformations are required, the method ends. If data transformations are required, data transformations are performed at step 235. At step 240, data is returned to the client according to the protocol in which the client is expecting to receive the data.

Example—Sequential to Keyed Mapping

An example of a method for data sharing in accordance with the teachings of the present disclosure is set forth below. To begin, the client application might intend to search a file for a record with a certain field equal to a certain value. For example, the file might be a list of employees having the employee's name in the first 40 characters, and the application wants to find the record for "John Doe". The teachings of the present disclosure detects that the client processes data using sequential I/O according to the POSIX standards. Thus, it expects to read records sequentially until it reads the record for "John Doe". On the server, a system of policy controls provides the administrator of the server a way to have fine-grained control over the client computers and applications that may access his data. These controls are implemented outside of the normal security and management policies found on the client computers or in the client applications.

The server component might detect that the underlying server file is implemented using keyed VSAM (a so-called VSAM KSDS—key-sequenced dataset). The teachings herein recognize that instead of sequentially searching through the file, we can instead use the proprietary VSAM API to perform an indexed lookup, finding the record for "John Doe" immediately and without having to sequentially read the file. Thus, the server component invokes the proper VSAM APIs to map the client application's processing into the capabilities of the proprietary VSAM system . . . in this case, a long sequence of "READ" operations from the client application might become a VSAM "SEARCH BY KEY" operation and a single record VSAM "READ". A potentially large amount of data transfer can be replaced by a single, small operation that just returns the desired record. Next, the data fetched by our VSAM logic is returned to the calling application. The application's standards-based "READ" is replaced by a different sequence of operations that result in the application efficiently fetching data from the server computer.

Additional Capabilities

The teachings of the present disclosure provide advanced capabilities for data sharing among mainframe and non-mainframe environments. Some of these capabilities are set forth below:

Navigate files in multiple directions (forward to backward, or backward to forward).
Read records by record number ("get the 423rd record").
Insert records anywhere in a file without rewriting it.
Delete records from anywhere in a file without rewriting it.
Update (re-write) individual records in place.
Perform updates or so-called "repeatable reads" with transactional integrity.
Process so-called alternate indexes where multiple search keys may be available for a given search argument.
Create files containing data to be printed on the target system.

Alter the structure of existing files, or create new files in proprietary formats.

Obtain comprehensive metadata for files on the server.

Participate in single- or multi-resource transactions, including the ability to COMMIT or ROLLBACK changes.

These capabilities and operations are available and used regardless of how the original client application is configured to access its data. The example above is based on a simple application using standards-based POSIX I/O APIs to access data. Much the same processing occurs if an alternate type of I/O on the client is used instead:

If the client used a SQL database approach, it might have generated a SQL "SELECT" in the example ("SELECT*FROM EMPLOYEES WHERE NAME="John Doe"). The processing on the server to map this request into a semantically equivalent VSAM operation is different, but achieves the same outcome. In a similar way, the application might have used BerkeleyDB, a popular open-source API for creating and accessing indexed files. As in the prior example, the flow differs slightly due to the nature of the client application's request, but the same concept of mapping a BerkeleyDB operation into VSAM operations can still be used.

In the other direction (e.g., client to server), if the record on the server were stored in a different type of proprietary filesystem, the client would perceive no difference. Instead of mapping the request to a VSAM I/O primitive, the client application's requests could also be mapped to other APIs, such as searching networked or hierarchical databases, "NoSQL" databases and so on.

In some cases, sophisticated applications can use the I/O primitives of the network transport level to further boost performance and flexibility. This amounts to transforming the primitive operations of the NFS, SMB or other file sharing protocols into VSAM or other low-level file I/O capabilities, as explained above.

The approach is also able to operate concurrently over different networks and protocols. One instance of an application following any of the paths outlined above might execute on a Linux computer using the NFS protocol, while another application running on a Windows computer might use the SMB protocol to access the same data. Up to the limits of the network, there can be as many concurrent applications processing the same (or different) data as desired.

Transactional Virtualization

Transactional virtualization is discussed in detail in U.S. patent application Ser. No. 16/680,963 and entitled "System and Method for Enhancing the Efficiency of Mainframe Operations," which is hereby incorporated by reference. Consistent with the teachings of the present disclosure, it is clear that the target of any transactional virtualization can be anywhere, including to platforms different from the originating source platform. However, a more robust definition of the target execution environment is required. For example, if a mainframe binary executable is taken to a Windows computer, an interpretive layer needs to be in place so that the mainframe executable can somehow be run on a computing architecture that's not native to it. At the other end of the spectrum, a Java program can generally run anywhere—there's no need for an extra layer of interpretation or emulation there. Thus, the approach to implement the teachings of the present disclosure will vary, depending on the nature of the application involved and the differences between the original source and the target. When an application is redirected, the following cases are available:

A similar type of computer running a compatible hardware architecture and operating system. One example is a z/OS to z/OS, redirection. The "rules" are simpler for any of these "same-to-same" migrations.

Cases where the application itself is not platform specific . . . these are also simpler—Java, for example, since a Java program can generally run anywhere. Systems based on scripting engines (SAS, for instance) might also be similar since the target system can generally execute the application directly without change.

Systems that may be referred to as "source-code based" . . . these are systems where it's possible to create an equivalent function application on the target by recompiling the source code from the original source system. This is usually an "out of band" operation, since the source code is unknown at the time of the actual redirection . . . it has to be figured out in advance and may be a manual process.

Systems that may be referred to as "binary emulators". These are systems capable of emulating the architecture and operating system of the original target system.

It should be recognized that a major step in the flow is maintaining a "catalog" of where and how to run any redirected application. In an example relying on a source-code approach, it may be necessary to build the application on the desired target ahead of time . . . this process becomes a major piece of the overall solution.

Data sharing among mainframe and non-mainframe resources in accordance with the teachings of the present disclosure provides many benefits that include the following:

Read/write access to non-SQL mainframe data from cloud-based applications using industry standard network-based file protocols.

Reduction or elimination of costly, complex ETL/ELT, file transfer, and data synchronization tools and techniques.

Simplification and uniformity of data access across all platforms (probably a benefit rather than a use case that follows the above 2 cases).

Without the need to ETL the data, access to the mainframe data to allow realtime use of familiar tools for analysis and reporting by business and IT operations analysts such as cognos, tableau, power bi.

Decoupling assignment of execution and build/dev environments from data lifecycle management and security capabilities and characteristics.

Enables edge computing of your mainframe data.

Figure 3:
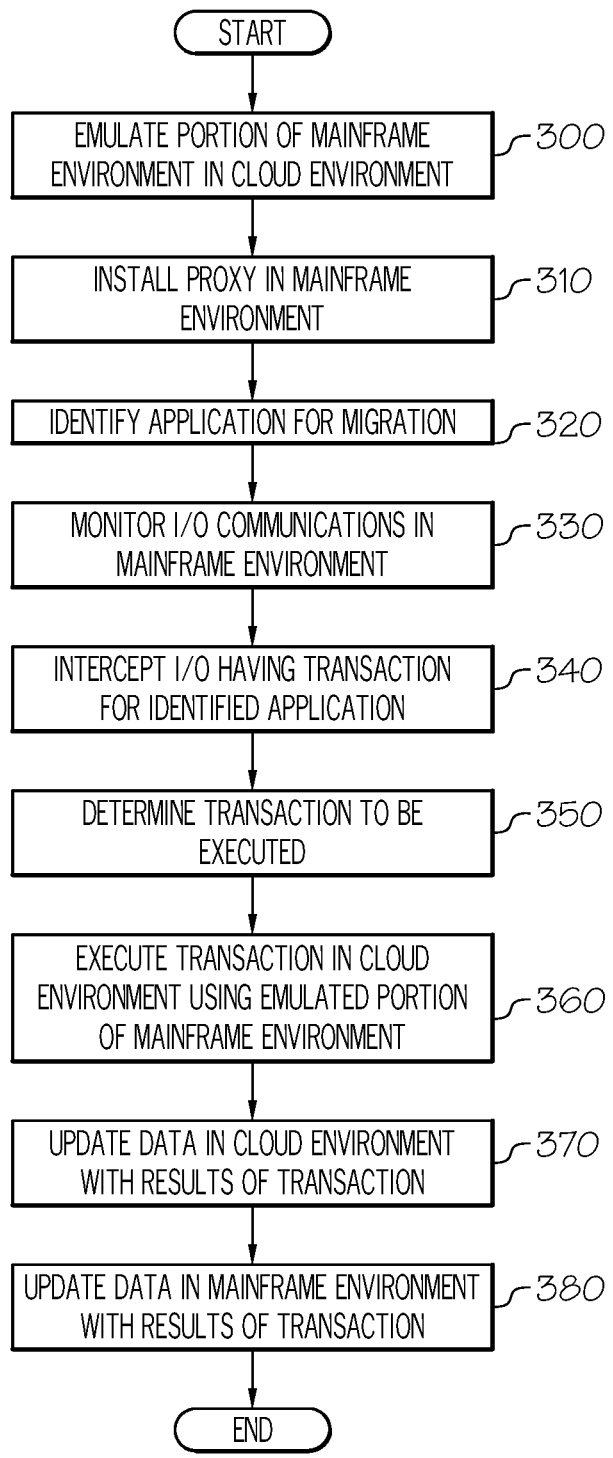
FIG. 3 illustrates a flowchart of a method for data sharing between mainframe and cloud, in accordance with another particular non-limiting embodiment of the present disclosure.

FIG. 3 illustrates a method for selective migration of mainframe resources to a cloud environment, in accordance with a particular embodiment of the present disclosure. The method starts at step 300 where a portion of the mainframe environment is emulated in a cloud environment. In certain embodiments, the portion emulated may comprise one or more applications. In other embodiments, the portion emulated may be one or more specific workloads, tasks, features or functions of the mainframe environment. By "emulating" a portion of the mainframe environment, it is meant that an environment is built in the cloud that can accomplish the functionality of the emulated portion. In other words, the functionality of one or more applications of the mainframe environment, or one or more workloads of the mainframe environment.

At step 310, a proxy is installed in the mainframe environment. In particular embodiments, the proxy will manage communications between the mainframe data environment and the cloud environment. The "proxy" is called such, since it acts as a proxy for the emulated portion of the mainframe data environment and communicates between the mainframe environment and the cloud environment to allow the emulated portion of the mainframe environment in the cloud environment.

Next, at step 320, an application is identified for migration. In other words, the application in the mainframe environment that will be at least partially replaced by the emulated portion in the cloud environment is identified. At step 330, I/O communications (e.g., operating system instructions) within the mainframe environment are monitored in order to identify a transaction(s) intended for the emulated portion of the mainframe environment. For example, transactions associated with a particular application, workload, or task may be identified.

At step 340, an I/O having a particular transaction intended for the particular application (workload, or task) is intercepted before the transaction is executed in the mainframe environment. Instead, at step 350, the proxy and/or resources outside of the mainframe environment (e.g., cloud environment) are used to determine the transaction to be executed, and what must be done to execute the transaction. In order to accomplish the transaction in the cloud environment, either the transaction or the cloud environment resources are configured in a manner that the transaction can be accomplished in the cloud environment.

Once the transaction to be executed is determined, the transaction is executed in the cloud environment using the emulated portion of the mainframe environment, at step 360. This is done before the transaction can be accomplished in the mainframe environment in order to save resources in the mainframe environment and have the transaction executed using substantially cheaper resources of the cloud environment. At step 370, the data in the cloud environment is updated with the results of the transaction, such that the emulated portion of the mainframe environment that is operating in the cloud environment is aware that the transaction is complete and the results of the transaction are taken into account, and written to the mainframe database and or the native distributed cloud database as the application requires. In this manner, future transactions that are accomplished in the cloud environment will do so having the benefit of, and able to leverage, the results of the transaction from either database.

At step 380, the data in the mainframe environment (e.g., datasets 118) are updated with the results of the transaction. This is accomplished in spite of the fact that the transaction was not carried out using resources of the mainframe environment and instead were accomplished using the much less expensive resources of the cloud environment. Thus, the data of the mainframe environment is "updated" as if the transaction was accomplished in the mainframe environment, even though the transaction was not accomplished in the mainframe environment.

By updating the data of the mainframe environment with the results of the transaction that was accomplished in the cloud environment, future transactions accomplished in the mainframe environment will do so having the benefit of, and able to leverage, the results of the transaction. Accordingly, applications or workstreams that remain in the mainframe environment and that are not (at least immediately) being migrated to the cloud environment, can continue to operate with the benefit of the results of the transaction carried out in the cloud environment.

Figure 4:
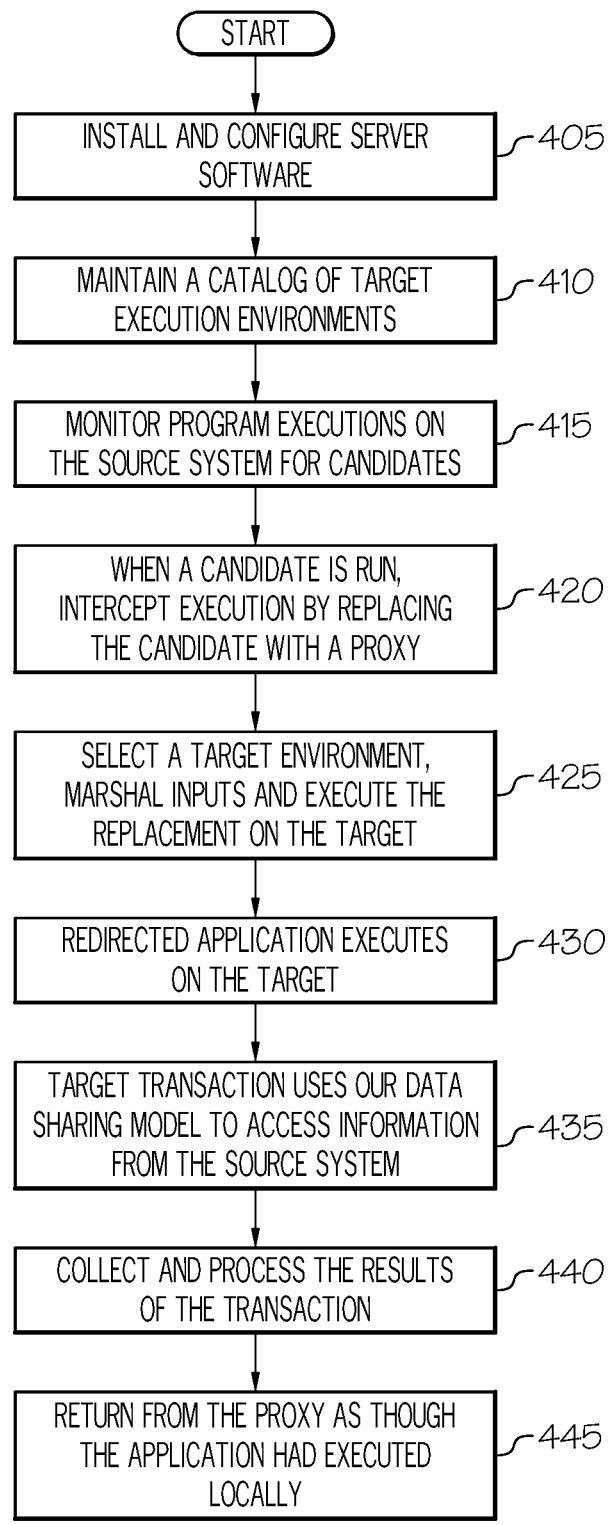
FIG. 4 illustrates a flowchart of a method for data sharing between mainframe and cloud, in accordance with another particular non-limiting embodiment of the present disclosure.

FIG. 4 illustrates an alternative embodiment of the teachings of the present disclosure. The method begins at step 405, where configuration server software is installed. At step 410, a catalog of target execution environments. This catalog is maintained to aid in redirecting transactions intended to be executed on the source system. At step 415, program executions on the source system are monitored for candidates. Thus, when a candidate is run at step 420, the execution is intercepted by replacing the candidate with a proxy.

At step 425, a target environment is selected, inputs are marshaled, and the replacement is executed on the target. Next, at step 430, the redirected application is executed on the target. The target transaction uses the data sharing model to access information from the source system, at step 435. At step 440, the results of the transaction are collected and processed, and at step 445, the results of the transaction are returned from the proxy as though the application had executed locally.

Figure 5:
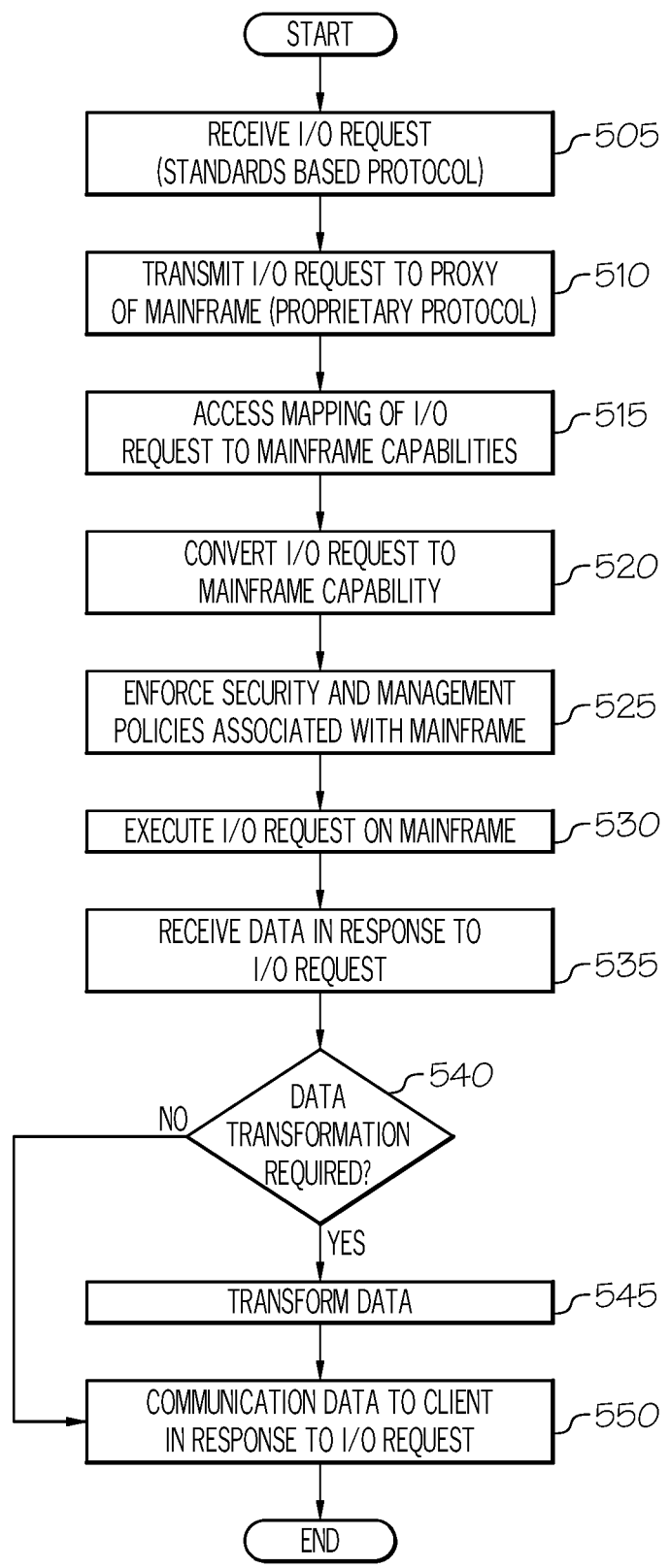
FIG. 5 illustrates a flowchart of a method for data sharing between mainframe and cloud, in accordance with another particular non-limiting embodiment of the present disclosure.

FIG. 5 illustrates an alternative embodiment of the teachings of the present disclosure. The method begins at step 505 when an input/output (I/O) request is received from a client device. The I/O request is in accordance with a standards-based I/O protocol (first protocol). At step 510, the I/O request is communicated to a proxy that is communicatively coupled with a mainframe server. The mainframe server is configured to communicate using a proprietary, mainframe protocol (second protocol) that is inconsistent with the first protocol. At step 515 a database having a mapping of a plurality of I/O requests of the first protocol to a plurality of corresponding capabilities of the second protocol is accessed. At step 520, the I/O request pursuant to the first protocol is converted to a corresponding capability pursuant to the second protocol. At step 525, security and management policies associated with the mainframe server are enforced, using the proxy.

Next, at step 530, the I/O request is executed on the mainframe server, using the corresponding capability pursuant to the second protocol. At step 535, data is received from the mainframe server, in response to the I/O request. At step 540, it is determined whether the data requires transformation in order to be consistent with the first protocol. If the data does not need transformation, the data is communicated to the client without transformation, at step 550. However, if it is determined that the data requires transformation at step 545, the data received from the mainframe server is transformed into a data format consistent with the first protocol, and the transformed data is communicated to the client in response to the I/O request, at step 550.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
Receiving, at a proxy communicatively coupled with a mainframe server, from a client device, an input/output (I/O) request pursuant to a first protocol, the first protocol being a standards-based I/O protocol;
the mainframe server being configured to communicate using a second protocol, the second protocol being a proprietary, mainframe protocol that is inconsistent with the first protocol;
accessing a database having a mapping of a plurality of I/O requests of the first protocol to a plurality of corresponding capabilities of the second protocol;
converting the I/O request pursuant to the first protocol to a corresponding capability pursuant to the second protocol;
enforcing, using the proxy, security and management policies associated with the mainframe server for executing the converted I/O request;
executing the converted I/O request on the mainframe server, using the corresponding capability pursuant to the second protocol;
receiving data from the mainframe server, in response to the converted I/O request;
determining whether the data requires transformation in order to be consistent with the first protocol;
in response to determining that the data requires transformation, transforming the data received from the mainframe server into a data format consistent with the first protocol; and
communicating the transformed data to the client device in response to the I/O request.

2. The method of claim 1, further comprising:
receiving additional I/O requests pursuant to the first protocol, from the client device;
for each of the additional I/O requests received pursuant to the first protocol:
communicating the additional I/O request to a proxy communicatively coupled with the mainframe server;
accessing the database having a mapping of a plurality of I/O requests of the first protocol to a plurality of corresponding capabilities of the second protocol;
converting the additional I/O request pursuant to the first protocol to an additional corresponding capability pursuant to the second protocol;
executing the converted additional I/O request on the mainframe server, using the corresponding additional capability pursuant to the second protocol;
receiving additional data from the mainframe server, in response to the converted additional I/O request;
determining whether the additional data requires transformation in order to be consistent with the first protocol;
in response to determining that the additional data requires transformation, transforming the additional data received from the mainframe server into the data format consistent with the first protocol; and
communicating the transformed additional data to the client device in response to the additional I/O request.

3. The method of claim 1, wherein the security and management policies associated with the mainframe server include backup policies, file size policies and encryption policies associated with the mainframe server.

4. The method of claim 1, wherein the mainframe server comprises a z/OS server employing a virtual storage access method (VSAM).

5. The method of claim 4, wherein the client device comprises a Microsoft SQL server, and the database comprises a mapping of a plurality of I/O requests associated with Microsoft SQL with a plurality of corresponding capabilities associated with VSAM.

6. The method of claim 1, wherein the client device comprises a computer running either a Microsoft Windows operating system or a Linux operating system.

7. A computer configured to access a storage device, the computer comprising:
a processor; and
a non-transitory, computer-readable storage medium storing computer-readable instructions that when executed by the processor cause the computer to perform:
receiving, from a client device, an input/output (I/O) request pursuant to a first protocol, the first protocol being a standards-based I/O protocol;
communicating the I/O request to a proxy communicatively coupled with a mainframe server, the mainframe server being configured to communicate using a second protocol, the second protocol being a proprietary, mainframe protocol that is inconsistent with the first protocol;
accessing a database having a mapping of a plurality of I/O requests of the first protocol to a plurality of corresponding capabilities of the second protocol;
converting the I/O request pursuant to the first protocol to a corresponding capability pursuant to the second protocol;
enforcing, using the proxy, security and management policies associated with the mainframe server for executing the converted I/O request;
executing the converted I/O request on the mainframe server, using the corresponding capability pursuant to the second protocol;

receiving data from the mainframe server, in response to the converted I/O request;

determining whether the data requires transformation in order to be consistent with the first protocol;

in response to determining that the data requires transformation, transforming the data received from the mainframe server into a data format consistent with the first protocol; and communicating the transformed data to the client device in response to the I/O request.

8. The computer of claim 7, wherein the computer-readable instructions further cause the computer to perform:

Receiving additional I/O requests pursuant to the first protocol, from the client device;

for each of the additional I/O requests received pursuant to the first protocol:

communicating the additional I/O request to a proxy communicatively coupled with the mainframe server;

accessing the database having a mapping of a plurality of I/O requests of the first protocol to a plurality of corresponding capabilities of the second protocol;

converting the additional I/O request pursuant to the first protocol to an additional corresponding capability pursuant to the second protocol;

executing the converted additional I/O request on the mainframe server, using the corresponding additional capability pursuant to the second protocol;

receiving additional data from the mainframe server, in response to the converted additional I/O request;

determining whether the additional data requires transformation in order to be consistent with the first protocol;

in response to determining that the additional data requires transformation, transforming the additional data received from the mainframe server into the data format consistent with the first protocol; and communicating the transformed additional data to the client device in response to the additional I/O request.

9. The computer of claim 7, wherein the security and management policies associated with the mainframe server include backup policies, file size policies and encryption policies associated with the mainframe server.

10. The computer of claim 7, wherein the mainframe server comprises a z/OS server employing a virtual storage access method (VSAM).

11. The computer of claim 10, wherein the client device comprises a Microsoft SQL server, and the database comprises a mapping of a plurality of I/O requests associated with Microsoft SQL with a plurality of corresponding capabilities associated with VSAM.

12. The computer of claim 7, wherein the client device comprises a computer running either a Microsoft Windows operating system or a Linux operating system.

13. A computer program product comprising:

a computer-readable, non-transitory storage medium having computer-readable program code embodied therewith, the computer-readable program code comprising:

computer-readable program code configured to receive, from a client device, an input/output (I/O) request pursuant to a first protocol, the first protocol being a standards-based I/O protocol;

computer-readable program code configured to communicate the I/O request to a proxy communicatively coupled with a mainframe server, the mainframe server being configured to communicate using a second protocol, the second protocol being a proprietary, mainframe protocol that is inconsistent with the first protocol;

computer-readable program code configured to access a database having a mapping of a plurality of I/O requests of the first protocol to a plurality of corresponding capabilities of the second protocol;

computer-readable program code configured to convert the I/O request pursuant to the first protocol to a corresponding capability pursuant to the second protocol;

computer-readable program code configured to enforce, using the proxy, security and management policies associated with the mainframe server for executing the converted I/O request;

computer-readable program code configured to execute the converted I/O request on the mainframe server, using the corresponding capability pursuant to the second protocol;

computer-readable program code configured to receive data from the mainframe server, in response to the converted I/O request;

computer-readable program code configured to determine whether the data requires transformation in order to be consistent with the first protocol;

computer-readable program code configured to, in response to determining that the data requires transformation, transform the data received from the mainframe server into a data format consistent with the first protocol; and computer-readable program code configured to communicate the transformed data to the client device in response to the I/O request.

14. The computer program product of claim 13, further comprising:

computer-readable program code configured to receive additional I/O requests pursuant to the first protocol, from the client device;

computer-readable program code configured to, for each of the additional I/O requests received pursuant to the first protocol:

communicate the additional I/O request to a proxy communicatively coupled with the mainframe server;

access the database having a mapping of a plurality of I/O requests of the first protocol to a plurality of corresponding capabilities of the second protocol;

convert the additional I/O request pursuant to the first protocol to an additional corresponding capability pursuant to the second protocol;

execute the converted additional I/O request on the mainframe server, using the corresponding additional capability pursuant to the second protocol;

receive additional data from the mainframe server, in response to the converted additional I/O request;

determine whether the additional data requires transformation in order to be consistent with the first protocol;

in response to determining that the additional data requires transformation, transforming the additional data received from the mainframe server into the data format consistent with the first protocol; and communicating the transformed additional data to the client device in response to the additional I/O request.

15. The computer program product of claim 13, wherein the security and management policies associated with the mainframe server include backup policies, file size policies and encryption policies associated with the mainframe server.

16. The computer program product of claim 13, wherein the mainframe server comprises a z/OS server employing a virtual storage access method (VSAM).

17. The computer program product of claim 13, wherein the client device comprises a Microsoft SQL server, and the database comprises a mapping of a plurality of I/O requests associated with Microsoft SQL with a plurality of corresponding capabilities associated with VSAM.

\* \* \* \* \*